April 15, 1930.  P. W. PRUTZMAN ET AL  1,754,401
TIPPING FILTER PRESS
Filed Jan. 4, 1928  2 Sheets-Sheet 2
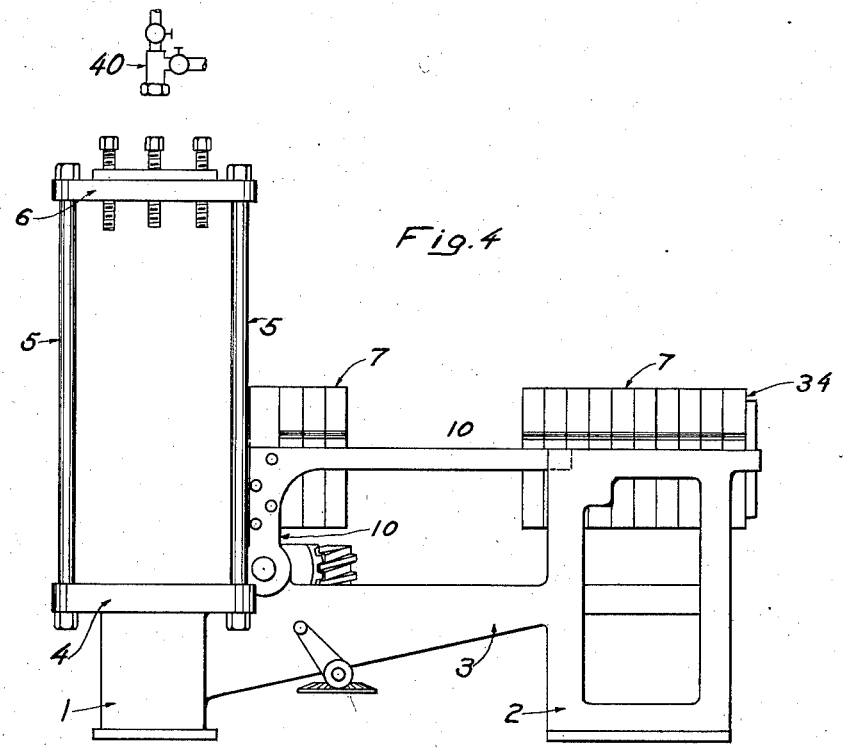
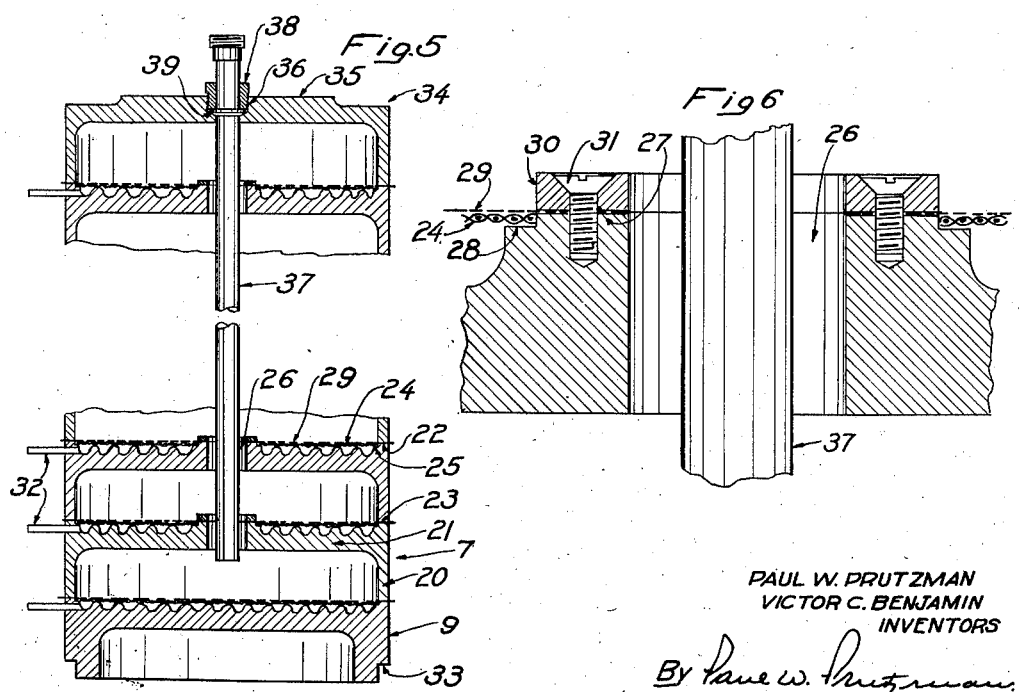
PAUL W. PRUTZMAN
VICTOR C. BENJAMIN
INVENTORS
By Paul W. Prutzman
ATTORNEY Patented Apr. 15, 1930

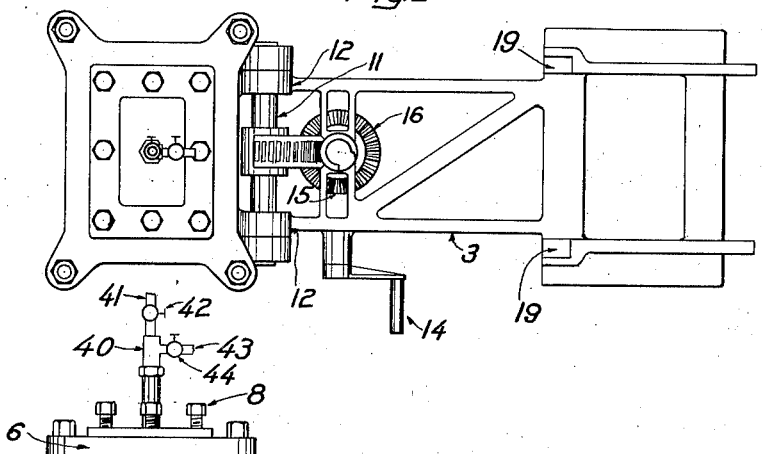
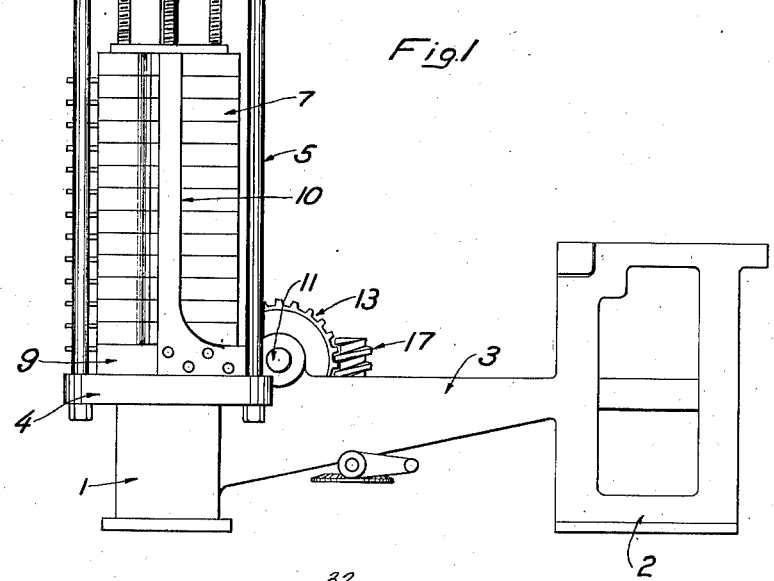
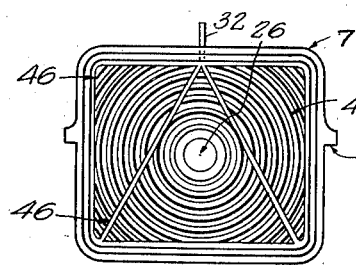

1,754,401

UNITED STATES PATENT OFFICE

PAUL W. PRUTZMAN AND VICTOR C. BENJAMIN, OF LOS ANGELES, CALIFORNIA, ASSIGNORS TO CONTACT FILTRATION COMPANY, OF SAN FRANCISCO, CALIFORNIA, A CORPORATION OF DELAWARE

TIPPING FILTER PRESS

Application filed January 4, 1928. Serial No. 244,536.

Our invention relates to the art of filtration, with especial reference to filtering lubricating oils, following a treatment with clay or other decolorizing agent at high temperature and while the oil is still hot.

A difficulty encountered in a filtration of this character is due to the nature of the filter cake formed, such cake being usually very dense, tough and difficult to handle. The general objections to a filter cake of this nature are; that cleaning the press after a filtration is tedious and expensive; that it is difficult to obtain a sufficient degree of cleanliness; that a dense filter cake rapidly slows down the rate of oil filtration, eventually stopping it completely, and that such a filter cake is difficult to clean by air-blowing and always retains a material quantity of oil.

The prime object of our invention is to obviate these difficulties. We accomplish this in part by conducting the filtration according to the process disclosed in U. S. Letters Patent No. 1,655,175, issued January 3, 1928 to Victor C. Benjamin, entitled Method of deodorizing and filtering oils, and in part by conducting the filtration in the apparatus herein disclosed.

In the said process the oil and clay are agitated together in a container at a temperature of 300° F. or higher by the direct injection of steam into the mixture, which is heated by means other than the injected steam. On the completion of this operation the oil and clay mixture receives additional steam by means of any suitable type of mixing valve, so that when said mixture enters the filter it is in a violently agitated condition, and the steam and oil pass together through a foraminous medium, the spent clay collecting thereon. The advantages of this process are; that the rate of filtering is practically constant up to complete filling of the press chamber; that the filter cake may be completely dried out by air blowing to a spongy mass, substantially free from oil and easily powdered, and that the efficiency of the clay used in the treatment is increased.

It will be obvious that this process requires filtration on a horizontal plate rather than on the vertical plates customarily used in pressure presses, as if the foraminous medium is not substantially horizontal during the filtration proper, the steam will separate from the oil in the press chamber, and the two fluids will pass through different portions of the foraminous area, and the desirable results obtained by concurrent passage of steam and oil through every portion of the foraminous medium will not be obtained.

The ordinary plate and frame press has vertical plates, which may be rendered horizontal by merely setting the plate assembly on end. In this position, however, it is mechanically difficult if not impossible to separate the plates for the purpose of cleaning, and further, the upper outlet from each chamber would permit the escape of the steam, which should pass through the lower cloth with the oil.

The prime object of our invention, therefore, is to provide a means by which the filtration step in the above said process may be rapidly and cheaply carried out.

A further object of our invention is to provide, in a filter press having surfaces normally operating in a horizontal position, means for quickly and economically cleaning the filtering units while such units and their attendant surfaces are retained in a vertical position.

We attain these objects by the mechanism illustrated in the accompanying drawing in which Figure 1 is a side elevation of our tipping press, Figure 2 is a plan view of same, Figure 3 is a front elevation of a single filtering unit, Figure 4 is a side elevation of our folding press showing the filtering units in the position for cleaning and repair of same, Figure 5 is a sectional elevation showing the manner of constructing and of assembling the filtering units, and Figure 6 is a detail of part of a filtering unit, showing the manner of securing the filter cloth at the center of the unit.

The pedestal 1, outer pedestal 2 and connecting frame 3 constitute the bed plate of this machine. A flat horizontal platform 4 integral with pedestal 1 carries four vertical standards 5, which support a second platform 6 on their upper ends. Between these platforms a plurality of the filtering units 7 are piled, held in pressural contact by the set screws 8 in the top platform.

Bolted or otherwise secured to opposite sides of the bottom filtering unit 9 are two arms 10, extending upwards along the filtering units. The horizontal portions of these arms terminate in hubs securely keyed on opposite ends of the shaft 11, which is adapted to rotate in journals 12. A segment of a worm wheel 13 is keyed in the center of shaft 11 and is driven by the hand crank 14 through gears 15 and 16 and worm 17, all secured to frame 3. By this assembly, on first screwing upward the set screws 8, the stack of filtering units can be folded down by operating the hand crank. Lugs 18 are provided on each side of each filtering unit, these lugs resting on the arms 10 when said arms are in the horizontal position.

Arms 10 come to rest in pockets 19 on the pedestal 2, which is so constructed as to then form a continuation of said arms on which the filtering units can be slid, thus providing the necessary space between them for cleaning and changing of the filter cloths. When the arms are down the units hang in the usual vertical position, making the cleaning operation easy.

The filtering units 7 are shown as each a single casting (Fig. 3 and Fig. 5) rectangular in outline (any other preferred shape may be used) composed of a web 21 corrugated on one side and substantially flat on the other, and a perimetric wall or flange 20 rising from the flat side. The ends 22 and 23 of wall 20 are square and parallel to each other. A wire screen 24 rests on the corrugations and on a shoulder 25, this shoulder extending around the inside of the perimetric wall so that the upper side of the screen is substantially in the plane of the end 22. In the center of the corrugated web 21 is an aperture 26, surrounded by a boss 27 in the plane of the end 22 of the perimetric wall, and provided with a step or shelf 28 for supporting the screen 24. A filter cloth 29, of any suitable material, having roughly the outline of the filtering unit but cut an inch or so larger and provided with a central hole substantially the size of the aperture 26, covers the screen 24 and is secured around said aperture by insertion under the flat band 30 on boss 27, said flat band being secured thereon by several screws 31. Around its outer edge the cloth is held between the abutting ends of adjacent units, sufficient pressure being supplied by the set screws 8 to prevent oil leakage. The space inside the perimetric wall and under the web is provided for the accumulation of sediment on the filter cloth below it. The corrugations intercommunicate with each other to a common filtrate outlet 32.

In Fig. 3 the numerals 45 indicate the corrugations referred to and 46—46 channels in the upper surface of the plate, intersecting said corrugations, through which filtrate may flow to and thus through the filtrate outlet 32. It will be understood that there are many well known manners of forming and placing these corrugations and channels and that we do not limit ourselves to the particular arrangement shown.

The bottom filtering unit 9 is without the aperture 26 and is provided with a heavier perimetric wall on which a step 33, running entirely around it, is adapted to fit a recess (not shown) in platform 4. The underside of cap 34 is the same as in the filtering units 7 but in place of the corrugated web a heavier plane web 35 is provided, adapted to receive the thrust of the set screws 8 and provided with an aperture 36 containing means for securing a pipe 37 therein.

Our filter press is quickly and easily prepared for operation. With the arms 10 in the horizontal position the several filtering units 7 with cloth attached are placed on such arms, depending therefrom by lugs 18, and are then slid together, forming a compact group ending with cap 34. On rotating the hand crank 14 the entire set is rotated as a unit to a vertical position resting on platform 4, after which the set screws can be tightened, making the joints between units oil tight by utilizing the filter cloth for a gasket as previously explained. Pipe 37 is inserted downward through the apertures in the several units and secured in the cap by a gland nut 38 encircling said pipe. This nut is screwed into aperture 36 and presses a collar 39 against a seat ground to produce an oil tight joint with the collar. This collar 39 is welded or otherwise permanently secured to the pipe 37, and serves to position the bottom end of said pipe at its proper point, i. e., just through the first filtering unit above the bottom unit 9. A union type pipe coupling connects pipe 37 to the mixing valve 40.

Clay-carrying oil comes from the treater, not shown, to the mixing valve 40 through pipe 41, controlled by valve 42, and steam enters mixing valve 40 through pipe 43, controlled by valve 44. The mixture coming from the mixing valve consisting of clay, oil and steam in an intimately divided and intermixed state, passes down through pipe 37 and therefrom into the filter. The apertures 26 having an inside diameter somewhat larger than the outside diameter of pipe 37, the mixture thus being enabled to pass upward through the annular space thus provided. Filtration proceeds downwardly through the cloths, the filtrate and the steam escaping through the outlets 32.

One of the requirements of the abovementioned process is that the steam be prevented from separating from the oil until after filtration.

In filter presses heretofore used, in which the cloth is retained in a substantially vertical position, the cloth is not subjected to a uniform mixture over its entire area, but to one which consists substantially of oil alone at the bottom of the chamber and of steam alone at the top. In our tipping press, with the units operating in a horizontal position and each one successively fed from the space next below, no opportunity is left for the steam to separate and pass alone through a portion of the filter cloth, each cloth being exposed to a uniform mixture over its entire surface.

We claim as our invention:

A filter press for separating solids from liquids by forcing the liquid through a foraminous medium on which the solid is retained, comprising; a bed block, a cap having thrust screws passing therethrough and a plurality of standards rigidly connecting said cap to said block; two substantially horizontal side extensions to said bed block and a supporting frame rigidly attached to the outer ends of said extensions; a horizontal shaft at right angles to and journalled on said side extensions at the end thereof adjacent said bed block; two side arms rigidly attached to said shaft and revoluble therewith, the outer ends of said arms being supported in a horizontal position by said supporting frame; a plurality of filtering plates adapted to be covered with a foraminous medium and to rest between said arms; lugs projecting from opposite sides of said plates adapted to support said plates in a vertical position on said arms when said arms are in a horizontal position; a bottom plate adapted to rest on said bed block and rigidly attached to the inner end of said arms; a top plate adapted to receive the thrust of said thrust screws for forcing said plates into non-leaking contact; means acting on said shaft for raising and lowering said side arms and the assemblage of said plates; means removably attached to said top plate for introducing a mixture of solid and liquid onto the upper side of said foraminous medium, and means for efflux of liquid passing through said medium.

In witness that we claim the foregoing we have hereunto subscribed our names this 30th day of December, 1927.

PAUL W. PRUTZMAN.
VICTOR C. BENJAMIN.